US009874193B2

(12) United States Patent
Gukelberger et al.

(10) Patent No.: US 9,874,193 B2
(45) Date of Patent: Jan. 23, 2018

(54) DEDICATED EXHAUST GAS RECIRCULATION ENGINE FUELING CONTROL

(71) Applicant: Southwest Research Institute, San Antonio, TX (US)

(72) Inventors: Raphael Gukelberger, San Antonio, TX (US); Gordon J. J. Bartley, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 13 days.

(21) Appl. No.: 15/223,658

(22) Filed: Jul. 29, 2016

(65) Prior Publication Data

US 2017/0363057 A1    Dec. 21, 2017

Related U.S. Application Data

(60) Provisional application No. 62/351,270, filed on Jun. 16, 2016.

(51) Int. Cl.
*F02M 25/07* (2006.01)
*F02B 47/08* (2006.01)
(Continued)

(52) U.S. Cl.
CPC .............. *F02P 5/045* (2013.01); *F02B 75/18* (2013.01); *F02M 26/03* (2016.02); *F02M 26/35* (2016.02);
(Continued)

(58) Field of Classification Search
CPC ... F02P 5/045; F02P 5/15; F02B 75/18; F02B 2075/1816; F02M 26/35; F02M 26/43;
(Continued)

(56) References Cited

U.S. PATENT DOCUMENTS

| 1,563,608 A | 12/1925 | Wood |
| 2,113,602 A | 4/1938 | Pratt |

(Continued)

FOREIGN PATENT DOCUMENTS

| GB | 2110791 A | 11/1982 |
| JP | 11247665 A | 9/1999 |

(Continued)

OTHER PUBLICATIONS

International Search Report (dated Oct. 2, 2006) issued in International Patent Application No. PCT/US05/40483. (WO2006052993) (5 pgs).

(Continued)

*Primary Examiner* — Hai Huynh
(74) *Attorney, Agent, or Firm* — Grossman, Tucker et al

(57) ABSTRACT

A method of operating an dedicated exhaust gas recirculation engine including a water gas shift catalyst by supplying ambient air and fuel to a dedicated cylinder at a first fuel to air equivalence ratio in the range of greater than 1.0 to 1.6 for a first number of engine cycles and, for a second number of engine cycles, supplying ambient air and fuel to the dedicated cylinder at a second fuel to air equivalence ratio in the range of 0.7 to less than 1.0. During the second number of cycles, spark timing of the dedicated cylinder is adjusted and a time delay when exhaust recirculated from the dedicated cylinder will be inducted into the cylinders is determined. At the end of the time delay, a second spark timing of the main cylinder is adjusted and the amount of fuel supplied to the main cylinders is increased.

19 Claims, 7 Drawing Sheets

(51) Int. Cl.
  *F02P 5/04*    (2006.01)
  *F02M 26/43*   (2016.01)
  *F02M 26/35*   (2016.01)
  *F02M 26/03*   (2016.01)
  *F02B 75/18*   (2006.01)
  *F02P 5/15*    (2006.01)

(52) U.S. Cl.
  CPC .............. *F02M 26/43* (2016.02); *F02P 5/15* (2013.01); *F02B 2075/1816* (2013.01)

(58) Field of Classification Search
  CPC ... F02M 26/03; F02D 41/0065; F02D 41/008; F02D 41/0087
  USPC ..... 123/406.48, 672, 673, 691, 692, 568.21; 701/103, 104, 105, 108
  See application file for complete search history.

(56) References Cited

U.S. PATENT DOCUMENTS

| | | |
|---|---|---|
| 3,156,162 A | 11/1964 | Wallace et al. |
| 3,303,831 A | 2/1967 | Sherman |
| 3,405,679 A | 10/1968 | Norris et al. |
| 3,405,697 A | 10/1968 | Marchand |
| 3,680,534 A | 8/1972 | Chavant |
| 3,805,752 A | 4/1974 | Cataldo |
| 3,924,576 A | 12/1975 | Siewert |
| 3,941,113 A | 3/1976 | Bauelin |
| 3,958,540 A | 5/1976 | Siewert |
| 3,963,000 A | 6/1976 | Kosaka et al. |
| 4,004,554 A | 1/1977 | Kosaka et al. |
| 4,059,076 A | 11/1977 | Kosaka et al. |
| 4,108,114 A | 8/1978 | Kosaka et al. |
| 4,131,095 A | 12/1978 | Ouchi |
| 4,179,892 A | 12/1979 | Heydrich |
| 4,201,180 A | 5/1980 | Iizuka |
| 4,224,912 A | 9/1980 | Tanaka |
| 4,350,133 A | 9/1982 | Greiner |
| 4,735,186 A | 4/1988 | Parsons |
| 4,783,966 A | 11/1988 | Aldrich |
| 5,178,119 A | 1/1993 | Gale |
| 5,207,714 A | 5/1993 | Hayashi et al. |
| 5,257,600 A | 11/1993 | Schechter et al. |
| 5,297,515 A | 3/1994 | Gale et al. |
| 5,343,699 A | 9/1994 | McAlister |
| 5,379,728 A | 1/1995 | Cooke |
| 5,456,240 A | 10/1995 | Kanesaka |
| 5,515,814 A | 5/1996 | Cooke |
| 5,517,976 A | 5/1996 | Bachle et al. |
| 5,524,582 A | 6/1996 | Suh et al. |
| 5,562,085 A | 10/1996 | Kosuda et al. |
| 5,894,726 A | 4/1999 | Monnier |
| 6,009,709 A | 1/2000 | Bailey |
| 6,138,650 A | 10/2000 | Bailey |
| 6,178,956 B1 | 1/2001 | Steinmann et al. |
| 6,216,458 B1 | 4/2001 | Alger et al. |
| 6,286,489 B1 | 9/2001 | Bailey |
| 6,343,594 B1 | 2/2002 | Koeslin et al. |
| 6,397,790 B1 | 6/2002 | Collier, Jr. |
| 6,425,381 B1 | 7/2002 | Rammer |
| 6,478,017 B2 | 11/2002 | Bianchi |
| 6,484,702 B1 | 11/2002 | Riley |
| 6,508,209 B1 | 1/2003 | Collier, Jr. |
| 6,536,392 B2 | 3/2003 | Widener |
| 6,543,230 B1 | 4/2003 | Schmid |
| 6,543,411 B2 | 4/2003 | Raab et al. |
| 6,609,374 B2 | 8/2003 | Feucht et al. |
| 6,655,324 B2 | 12/2003 | Cohn et al. |
| 6,672,292 B2 | 1/2004 | Fischer |
| 6,742,507 B2 | 6/2004 | Keefer et al. |
| 6,789,531 B1 | 9/2004 | Remmels |
| 6,820,415 B2 | 11/2004 | Abet et al. |
| 6,871,642 B1 | 3/2005 | Osterwald |
| 6,877,464 B2 | 4/2005 | Hitomi et al. |
| 6,877,492 B1 | 4/2005 | Osterwald |
| 6,915,776 B2 | 7/2005 | zur Loye et al. |
| 6,918,251 B2 | 7/2005 | Yanagisawa et al. |
| 6,923,149 B2 | 8/2005 | Nishimoto et al. |
| 6,945,235 B1 | 9/2005 | Bertilsson et al. |
| 7,028,680 B2 | 4/2006 | Liu et al. |
| 7,032,578 B2 | 4/2006 | Liu et al. |
| 7,140,357 B2 | 11/2006 | Wei et al. |
| 7,168,250 B2 | 1/2007 | Wei et al. |
| 7,232,553 B2 | 6/2007 | Oh et al. |
| 7,261,064 B2 | 8/2007 | Bhaisora et al. |
| 7,290,504 B2 | 11/2007 | Lange |
| 7,384,620 B2 | 6/2008 | Bowman et al. |
| 7,389,770 B2 | 6/2008 | Bertilsson et al. |
| 7,648,785 B2 | 1/2010 | Hu et al. |
| 7,721,541 B2 | 5/2010 | Roberts, Jr. et al. |
| 7,757,677 B2 | 7/2010 | Dobrila |
| 7,779,823 B2 | 8/2010 | Winstead |
| 7,801,664 B2 | 9/2010 | Winstead |
| 7,818,959 B2 | 10/2010 | Hu et al. |
| 7,945,376 B2 | 5/2011 | Geyer et al. |
| 7,945,377 B1 | 5/2011 | Van Nieuwstadt et al. |
| 8,100,093 B2 | 1/2012 | Morgenstern |
| 8,291,891 B2 | 10/2012 | Alger, II et al. |
| 8,311,723 B2 | 11/2012 | McAlister |
| 8,387,593 B2 | 3/2013 | Ichihara et al. |
| 8,463,529 B2 | 6/2013 | Hu |
| 8,557,458 B2 | 10/2013 | Scotto et al. |
| 8,561,599 B2 | 10/2013 | Gingrich et al. |
| 8,668,752 B2 | 3/2014 | Scotto et al. |
| 8,695,540 B2 | 4/2014 | Minick |
| 8,752,532 B2 | 6/2014 | Korenaga et al. |
| 8,838,367 B1 | 9/2014 | McAlister |
| 8,893,687 B2 | 11/2014 | Gingrich et al. |
| 8,904,786 B2 | 12/2014 | Hayman |
| 8,944,034 B2 | 2/2015 | Gingrich et al. |
| 8,966,896 B2 | 3/2015 | Jacques et al. |
| 9,083,020 B2 | 7/2015 | Scotto |
| 9,091,204 B2 | 7/2015 | McAlister |
| 9,118,048 B2 | 8/2015 | Scotto |
| 9,140,220 B2 | 9/2015 | Scotto |
| 9,145,837 B2 | 9/2015 | Klingbeil |
| 9,169,773 B2 | 10/2015 | Bromberg et al. |
| 9,178,235 B2 | 11/2015 | Scotto et al. |
| 9,206,769 B2 | 12/2015 | Burrahm |
| 9,255,560 B2 | 2/2016 | McAlister |
| 9,297,320 B2 | 3/2016 | Hilditch et al. |
| 9,328,697 B2 | 5/2016 | Peters et al. |
| 9,377,105 B2 | 6/2016 | McAlister |
| 9,453,465 B2 | 9/2016 | Bidner et al. |
| 9,464,584 B2 | 10/2016 | Gingrich et al. |
| 9,574,487 B2 | 2/2017 | Gruber et al. |
| 9,611,794 B2 | 4/2017 | Blythe et al. |
| 9,657,692 B2 | 5/2017 | Chiu |
| 2001/0015193 A1 | 8/2001 | Tanaka et al. |
| 2002/0189598 A1 | 12/2002 | Remmels |
| 2003/0121484 A1 | 7/2003 | Wang |
| 2004/0074480 A1 | 4/2004 | Chen et al. |
| 2004/0099256 A1 | 5/2004 | Stewart |
| 2005/0016792 A1 | 1/2005 | Graefenstein |
| 2005/0022450 A1 | 2/2005 | Tan et al. |
| 2006/0059896 A1 | 3/2006 | Liu et al. |
| 2006/0070587 A1 | 4/2006 | Bhalsora et al. |
| 2006/0112940 A1 | 6/2006 | Roberts, Jr. et al. |
| 2007/0028901 A1 | 2/2007 | Watakabe et al. |
| 2007/0193270 A1 | 8/2007 | Roozenboom et al. |
| 2009/0120385 A1 | 5/2009 | Munshi et al. |
| 2009/0199825 A1 | 8/2009 | Piper et al. |
| 2009/0308070 A1 | 12/2009 | Alger, II et al. |
| 2011/0031162 A1 | 2/2011 | Drnevich et al. |
| 2011/0041495 A1 | 2/2011 | Yager |
| 2011/0146267 A1 | 6/2011 | Hepburn et al. |
| 2012/0006288 A1 | 1/2012 | Winstead |
| 2012/0078492 A1 | 3/2012 | Freund et al. |
| 2012/0167863 A1 | 7/2012 | Kulkarni |
| 2012/0204844 A1 | 8/2012 | Gingrich et al. |
| 2012/0204845 A1 | 8/2012 | Gingrich et al. |
| 2012/0216530 A1 | 8/2012 | Flynn et al. |
| 2012/0285426 A1 | 11/2012 | Hayman et al. |

(56) References Cited

U.S. PATENT DOCUMENTS

| | | |
|---|---|---|
| 2013/0000320 A1 | 1/2013 | McKenna et al. |
| 2013/0030672 A1 | 1/2013 | Klingbeil |
| 2013/0133616 A1 | 5/2013 | Klingbeil |
| 2013/0216473 A1 | 8/2013 | Nicole et al. |
| 2013/0323145 A1 | 12/2013 | Tran et al. |
| 2014/0196697 A1 | 7/2014 | Burrahm |
| 2014/0196702 A1 | 7/2014 | Gingrich |
| 2014/0223903 A1 | 8/2014 | Keating |
| 2014/0261322 A1 | 9/2014 | Geckler et al. |
| 2014/0331668 A1 | 11/2014 | Bidner et al. |
| 2014/0331970 A1 | 11/2014 | Bidner et al. |
| 2015/0361927 A1 | 12/2015 | Glugla |
| 2016/0017847 A1 | 1/2016 | Hilditch et al. |
| 2016/0076488 A1 | 3/2016 | Henry |
| 2016/0245239 A1 | 8/2016 | Henry |
| 2016/0341157 A1 | 11/2016 | Henry |
| 2017/0074214 A1 | 3/2017 | Chiu |

FOREIGN PATENT DOCUMENTS

| | | |
|---|---|---|
| JP | 2004278433 A | 10/2004 |
| JP | 2005-054605 A | 3/2005 |
| JP | 2006-336465 A | 12/2006 |
| JP | 2011099375 A | 5/2011 |
| WO | 200071881 A1 | 11/2000 |
| WO | 2006052993 A2 | 5/2006 |
| WO | 2010146048 A1 | 12/2010 |

OTHER PUBLICATIONS

International Preliminary Report on Patentability/Written Opinion (dated Oct. 2, 2006) issued in International Patent Application No. PCT/U505/40483. (WO2006052993) (7 pgs).

U.S. Office Action dated May 28, 2013 issued in related U.S. Appl. No. 13/025,901 (17 pgs.).

U.S. Office Action dated Dec. 12, 2013 issued in related U.S. Appl. No. 13/025,901 (16 pgs.).

U.S. Office Action dated May 21, 2014 issued in related U.S. Appl. No. 13/025,901 (15 pgs.).

U.S. Office Action dated Mar. 22, 2013 issued in related U.S. Appl. No. 13/025,912 (6 pgs.).

US Office Action dated Apr. 6, 2016 issued in U.S. Appl. No. 14/487,463 (21 pgs).

US Office Action dated Oct. 20, 2016 issued in U.S. Appl. No. 14/487,463 (20 pgs).

US Office Action dated Jun. 27, 2016 issued in U.S. Appl. No. 14/631,384 (12 pgs).

US Office Action dated Oct. 3, 2016 issued in U.S. Appl. No. 14/851,890 (8 pgs).

Caterpillar "Application and Installation Guide, Gas Engine Emissions"; © 2007 Caterpillar ® (31 pgs).

Hacarlioglu, et al; "Studies of the Methane Steam Reforming Reaction at High Pressure in a Ceramic Membrane Reactor"; Abstract only—accessed Sep. 15, 2015 <<http://www.sciencedirect.com/science/article/pii/S100399530660011X>>.

Hankinson, et al; Ignition Energy and Ignition Probability of Methane-Hydrogen-Air Mixtures; accessed May 30, 2013 <<http://conference.ing.unipi.it/ichs/images/stories/papers/125.pdf>>.

Saxena, et al; "The Influence of Hydrogen and Carbon Monoxide on Structure and Burning Velocity of Methane Flames"; 2009 Fall Technical Meeting of the Western States Section of the Combusion Institute Hosted by the Univ of Cali at Irvine, CA, Oct. 26-27, 2009, Paper #09F-86, 20 pgs; accessed May 20, 2015 <<http://www.engr.ucr.edu/WSSCIConference/Exampleformat.pdf>>.

Wu, H. et al., "Ni-Based Catalysts for Low Temperature Methane Stream Reforming: Recent Results on Ni—Au and Comparison with Other Bi-Metallic Systems", Catalysts 2013, vol. 3, pp. 563-583.

Zanfir, et al; Catalytic Combustion Assisted Methane Steam Reforming in a Catalytic Plate Reactor; Chemical Engineering Science vol. 58, pp. 3947-3960, 2003.

US Office Action dated May 1, 2017 issued in related U.S. Appl. No. 14/631,384 (13 pgs).

US Office Action dated Feb. 6, 2017 issued in related U.S. Appl. No. 14/718,531 (16 pgs).

DEDICATED EXHAUST GAS RECIRCULATION ENGINE FUELING CONTROL

CROSS-REFERENCE TO RELATED APPLICATIONS

The present application claimed the benefit of the filing date of U.S. Provisional Application No. 62/351,270, filed on Jun. 16, 2016, the teachings of which are incorporated herein by reference.

FIELD

The present disclosure is directed to engine fueling control in engines with dedicated cylinder exhaust gas recirculation configurations.

BACKGROUND

The water gas shift reaction has been employed in industrial processes to produce $H_2$ from water vapor and carbon monoxide. The basic water gas shift reaction is set forth in Equation 1, provided below.

$$CO + H_2O \leftrightarrows CO_2 + H_2 \qquad \text{Eq. 1)}$$

Use of a water gas shift catalyst in the exhaust stream of a richly operated dedicated cylinder in a dedicated exhaust gas recirculation engine (operating at an air to fuel ratio of 13.5:1 or less) would be desirable to increase $H_2$ levels in the exhaust gas. Increased $H_2$ levels lead to further improved burn durations, combustion stability, decreased HC emissions, and greater knock resistance which can directly translate into enhanced engine efficiency.

However, when employed in an engine, and in particularly in conjunction with a richly operated dedicated cylinder, the exhaust gas composition is substantially different than the exhaust gas of industrial processes. It has been observed that when water gas shift catalysts are used for only few hours in the exhaust gas environment, and particularly in conjunction with a richly operated dedicated cylinder, a loss in water gas shift reactivity occurs. The loss in water gas shift reactivity being indirectly measured by the carbon monoxide conversion efficiency of the water gas shift catalysts.

SUMMARY

An aspect of the present disclosure relates to a method of operating a dedicated exhaust gas recirculation engine including a water gas shift catalyst located in a flow path of an exhaust gas recirculation flow path. The method includes supplying air to a main cylinder and a dedicated cylinder, wherein the air includes ambient air. In addition, exhaust recirculated from the dedicated cylinder is supplied into the main cylinder with the air. Fuel is also supplied to the main and dedicated cylinders. The air and fuel in the main and dedicated cylinders are combusted, wherein the air in the main cylinder also includes the exhaust. Exhaust from the dedicated cylinder is recirculated to the main cylinder. For a first number of engine cycles the air and the fuel are supplied to the dedicated cylinder at a first fuel to air equivalence ratio in the range of greater than 1.0 to 1.6 and for a second number of engine cycles the air and fuel are supplied to the dedicated cylinder at a second fuel to air equivalence ratio in the range of 0.7 to less than 1.0. In addition, a first spark timing of the dedicated cylinder is adjusted during the second number of cycles at the second fuel to air equivalence ratio. A time delay for when exhaust recirculated from the dedicated cylinder will be inducted into the main cylinder is then determined. At the end of the time delay a second spark timing of the main cylinder is adjusted and an amount of the fuel supplied to the main cylinder is increased.

In another aspect, the present disclosure is directed to a system for the operation of a dedicated exhaust gas recirculation engine including a water gas shift catalyst located in an exhaust gas recirculation flow path. The system includes an air inlet flow path coupled to through an air intake manifold to a main cylinder. In addition, the air inlet flow path is coupled to a dedicated cylinder. Each of the main cylinder and the dedicated cylinder comprises an intake valve, an exhaust valve and a spark plug. The system also includes a first fuel injector associated with the main cylinder and a second fuel injector associated with the dedicated cylinder. An exhaust gas recirculation flow path is coupled to the exhaust valve of the dedicated cylinder and to the air intake manifold. In addition, a water gas shift catalyst is located in the exhaust gas recirculation flow path. A plurality of sensors, including at least one sensor operatively coupled to the air inlet flow path, at least one sensor operatively coupled to the air intake manifold, and at least one sensor operatively coupled to the exhaust gas recirculation flow path. Further, the system includes an electronic control unit operatively coupled to the plurality of sensors, the fuel injectors, the intake valves, and the exhaust valves. The electronic control unit is configured to a) adjust a first fuel to air equivalence ratio in the dedicated cylinder in the range of greater than 1.0 to 1.6 for a first number of engine cycles; b) adjust a second fuel to air equivalence ratio in the dedicated cylinder in the range of 0.7 to less than 1.0 for a second number of engine cycles which are alternated with the first number of cycles; c) adjust a first spark timing of the spark plug in the dedicated cylinder during the second number of cycles; d) determine a time delay when exhaust recirculated from the dedicated cylinder will be inducted into the main cylinder; and e) at the end of the time delay adjust a second spark timing of the spark plug in the main cylinder and adjust an amount of fuel supplied to the main cylinder by the fuel injector associated with the main cylinder.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
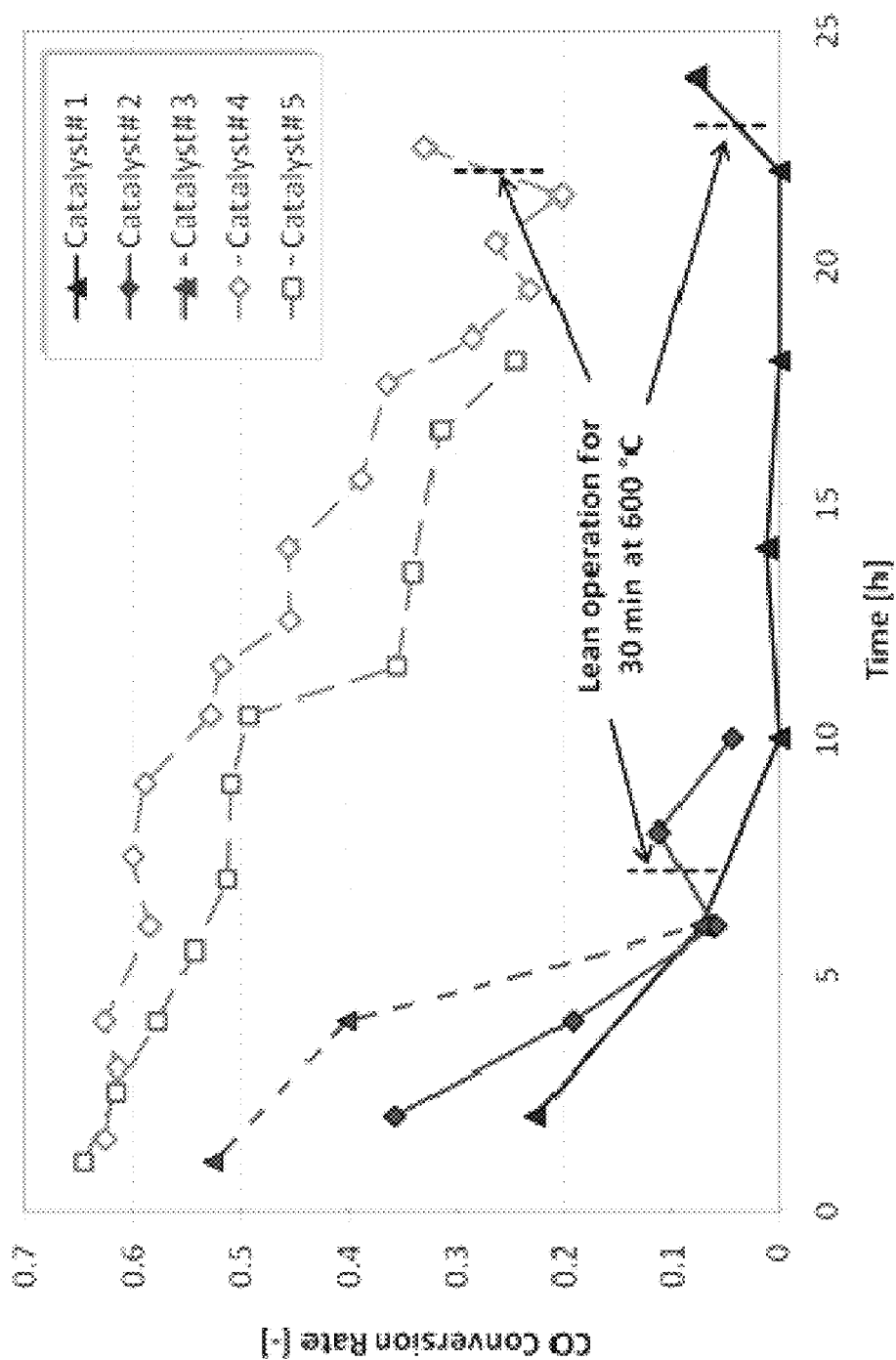
FIG. 1 illustrates the loss in carbon monoxide conversion rates in a number of water gas shift catalysts over a period time as well as an increase in carbon monoxide conversion rates due to regeneration by lean operation for 30 minutes at 600° C.

Based on further research the deterioration of the water gas shift catalyst was determined to be caused by catalyst coking. Due to the constant exposure of rich exhaust gas, relatively significant amounts of carbonaceous deposits accumulate on the catalyst surface. This coke formation eventually led to catalyst deactivation. The deactivated catalysts were preferably regenerated by lean operation at relatively high temperatures, around 600° C., for 30 minutes to confirm coke formation led to deactivation. Some of the surface coke deposits were burned off and the carbon monoxide conversion efficiency was increased. However, complete catalyst regeneration was not achieved in the experiments and the initial reactivity could not be reached. The rapid and complete water gas shift catalyst deactivation, after only a few hours, prohibits the production viability of this technology on dedicated exhaust gas recirculation engines. To bring the water gas shift catalyst into production further development to avoid the formation of a solid coke layer on the catalyst surface is imperative.

Exhaust gas recirculation (EGR) systems recirculate a portion of the exhaust gas in a gasoline or diesel engine back into the combustion chamber. In relatively lean operating diesel engines this may reduce nitrogen oxide ($NO_x$) and in gasoline engines this may mitigate engine knock and reduce pumping work and heat transfer losses. Dedicated cylinder systems, known as dedicated exhaust gas recirculation systems, include at least one dedicated cylinder from which the exhaust gas is recirculated back into the air intake and is mixed with ambient air to be inducted into the engine. The cylinder is preferably run with a rich mixture of fuel and air having an air to fuel ratio, in gasoline engines, of 13.5 (i.e., 13.5:1) or less, such as in the range of 9.1 to 13.5. The excess fuel from the rich combustion condition is reformed into carbon monoxide (CO) and hydrogen ($H_2$) and may reduce carbon dioxide ($CO_2$) and water vapor ($H_2O$) in the exhaust gas. The carbon monoxide (CO) and hydrogen ($H_2$) improve octane and reduce knock when recirculated. However, hydrogen ($H_2$) production is preferred as it improves burn duration and combustion stability, decreases hydrocarbon emissions, and provides greater knock resistance improving engine efficiency. Water gas shift catalysts promote $H_2$ production from the carbon monoxide and water vapor present in the exhaust gas. The basic water gas shift reaction is set forth in Equation 1, provided below:

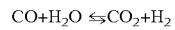

Previous patent and published applications discuss the use of water gas shift catalysts in engines and include, for example, U.S. Pat. No. 5,297,515, entitled "Fuel Supply Systems For Engines and Combustion Processes Therefor" and issued on Mar. 29, 1994; U.S. Pat. No. 8,561,599, entitled "EGR Distributor Apparatus for Dedicated EGR Configuration" and issued on Oct. 22, 2013; U.S. Pat. No. 8,893,687, entitled "Fuel Injection Strategy For Internal Combustion Engine Having Dedicated EGR Cylinders" and issued on Nov. 25, 2014; U.S. Pat. No. 8,944,034, entitled "Dedicated EGR Control Strategy for Improved EGR Distribution and Engine Performance" and issued on Feb. 3, 2015; US Published Application No. 2014/0196702, entitled "Ignition and Knock Tolerance in Internal Combustion Engine by Controlling EGR Composition" and published on Jul. 17, 2014; US 2016/0076488, entitled "Apparatus and Methods for Exhaust Gas Recirculation for an Internal Combustion Engine Powered by a Hydrocarbon Fuel" and published on Mar. 12, 2016; U.S. application Ser. No. 14/631,384 filed on Feb. 25, 2015 and entitled "Apparatus and Methods for Exhaust Gas Recirculation for an Internal Combustion Engine Utilizing at Least Two Hydrocarbon Fuels"; and U.S. patent application Ser. No. 14/718,531 filed on May 21, 2015 and entitled "Combined Steam Reformation Reactions and Water Gas Shift Reactions for On-Board Hydrogen Production in an Internal Combustion Engine", all of which being assigned to the assignee of the present disclosure and the teachings of which are all incorporated by reference.

As noted above, the rich operating conditions of the dedicated cylinder also generate carbonaceous deposits that accumulate on the surface of the catalyst. It has been observed that when water gas shift catalysts are used for only few hours in the exhaust gas environment of the constantly rich operated dedicated cylinder, a complete loss of water gas shift reactivity occurs as illustrated in FIG. 1, which depicts the conversion efficiency of a variety of water gas shift catalysts. Water gas shift reactivity was indirectly determined based on measured carbon monoxide conversion efficiency of the water gas shift catalysts.

The rapid deterioration was determined to be caused by catalyst coking. Due to the constant exposure of rich exhaust gas, relatively significant amounts of carbonaceous deposits accumulated on the catalyst surface. This coke formation can eventually lead to complete catalyst deactivation. The nearly deactivated catalysts were regenerated by lean operation at high temperatures of 600° C. for thirty minutes (also indicated in FIG. 1) to confirm coke formation led to deactivation. Some of the surface coke deposits were burned off and the carbon monoxide conversion efficiency was increased. However, complete catalyst regeneration was not achieved in the experiments and the initial reactivity could not be reached.

Provided for herein is a fueling strategy, including an engine and method for the implementation of the fueling strategy to avoid catalyst degradation. The fueling control strategy incorporates a relatively frequent and cycle-to-cycle based rich-lean switching mechanism to avoid the gradual coke build-up on the catalyst surface. In the fueling control strategy, after engine start and preferably at every eighth to tenth engine cycle, the dedicated cylinder is leaned out to prevent the coke deposits forming a solid layer on the catalyst and deactivating the catalyst. In the other seven to nine engine cycles, the dedicated cylinder is run rich. The rich-lean cycles are alternated during operation of the engine. The interval may be preferably adjusted depending on fuel composition as well as the operating conditions such as load and speed. During the lean cycles, the air-to-fuel (AFR) ratio in the dedicated cylinder is preferably leaned out by 5 to 10% to produce excess oxygen which is required to burn off the carbon deposits. Since the altered air-to-fuel ratio changes the effective mean pressures in the dedicated cylinder(s), the knock resistance, and the reformate production inducted by the main cylinders, a spark timing compensation strategy is also preferably applied and is described further herein.

Figure 2A:
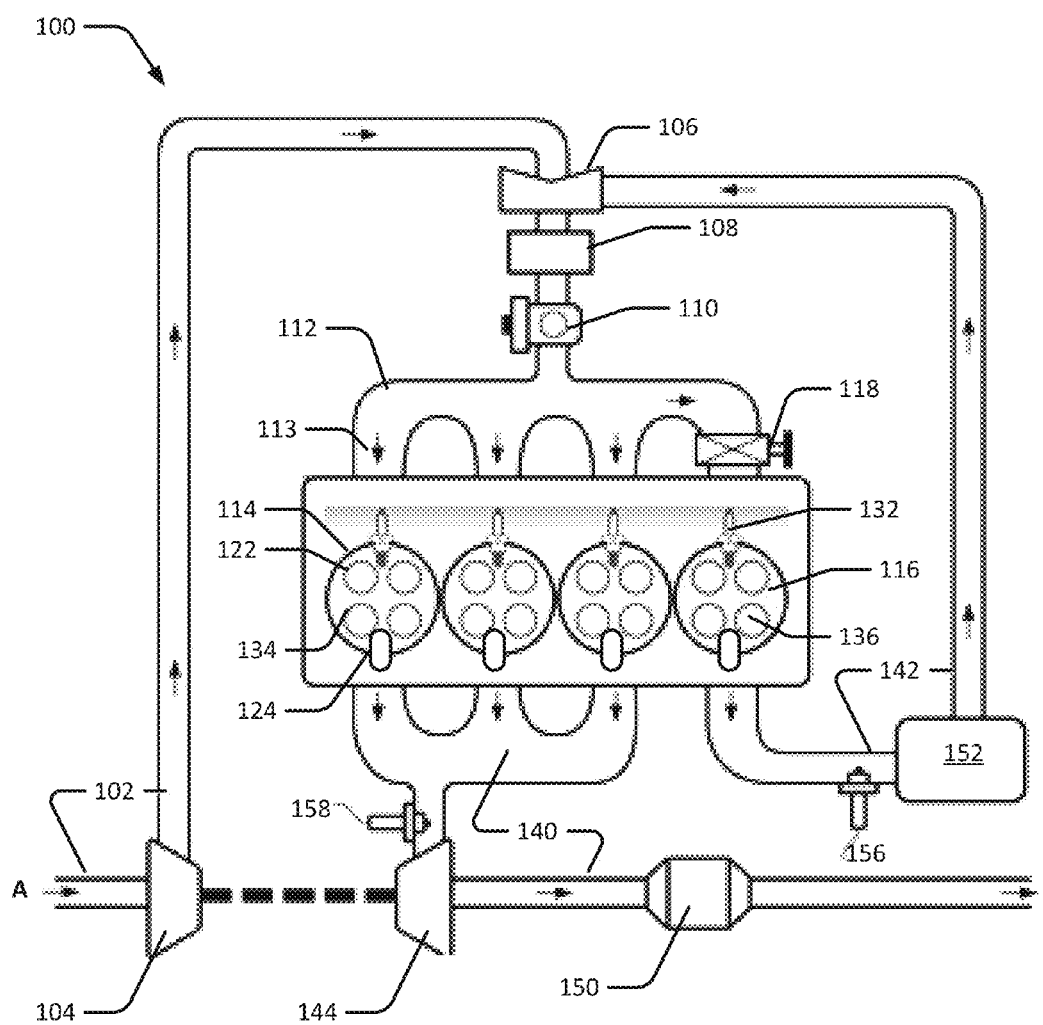
FIG. 2a illustrates a schematic of an embodiment of an engine including an exhaust gas recirculation loop, including a water gas shift catalyst provided in the flow path, and a dedicated exhaust gas recirculation cylinder.

Beginning with the engine, FIG. 2a illustrates an embodiment of a dedicated exhaust gas recirculation system. In the embodiment depicted in FIG. 2a, ambient air "A" is introduced to the engine through an air inlet pathway 102. It is compressed in a compressor 104 and flows to a mixer 106, both positioned in the air inlet pathway. The mixer mixes the ambient air with recirculated exhaust gas. The mixed air passes through an intercooler 108 and through the main throttle 110. From the main throttle 110, the mixed air passes through the intake manifold 112 into each cylinder 114, 116. Cylinders 114 (unshaded) are main cylinders and cylinder 116 (shaded) is a dedicated cylinder for exhaust gas recirculation. While three main cylinders and one dedicated cylinder are illustrated, it may be appreciated that more than three, or less than three main cylinders may be provided in the range of one main cylinder to eleven main cylinders. Further while one dedicated cylinder is illustrated, it may be appreciated more than one dedicated cylinder may be provided in the range of one to four dedicated cylinders. A port valve 118 may be included between the air intake manifold 112 and the dedicated exhaust gas recirculation cylinder(s) 116. The mixed air then enters the cylinders through the intake valves 122.

Fuel is injected into the cylinders 114, 116 through one or more fuel injectors 124, which regulate one or more of the amount, speed, pressure and duration (i.e., pulse width) in which the fuel is introduced into the cylinder combustion chamber. The fuel injectors may be configured as port fuel injectors, which inject fuel in the runners or ports of the air intake manifold just upstream of the cylinder intake valves, or as direct injectors, which inject fuel into the cylinder and combustion chamber. Fuel may also be supplied through fumigation. A combination of two or more of the above fueling strategies (port fuel injection, direct fuel injection and fumigation) may be utilized. For example, fuel may be introduced into the main cylinders using port injector and may be introduced into the dedicated cylinder through a direct injector. As illustrated, the fuel injectors are configured as direct injectors. Fuel injection timing may be adjusted and based on a number of factors including air mixture composition, speed and load. In addition, each cylinder includes a spark plug 132 for igniting the air-fuel mixture in the cylinder combustion chamber. Spark timing may also be adjusted and based on a number of factors, described further herein, including air-fuel composition, speed and load.

Exhaust gasses exit the main combustion cylinders 114 through exhaust valves 134 into the exhaust manifold 140 and from the dedicated cylinder 116 through exhaust valve 136 into the exhaust recirculation flow path 142. Exhaust gas in the exhaust manifold 140 passes through a turbine 144, which drives the compressor 104, and then flows through the exhaust treatment system 150, which may include, for example, a three way catalyst, particulate filter and muffler. The exhaust gas that passes into the exhaust recirculation flow path 142, is preferably directed through a water gas shift catalyst 152 and then to the mixer 106 to be mixed with the ambient air "A". In addition to, or alternatively to, the water gas shift catalyst, a steam reforming catalyst may be employed. The intake and exhaust values may be opened and closed using a variable valve train (illustrated in FIG. 3, item 180) and with variable valve timing. In addition, instead of a boosted engine, as described and illustrated above, a naturally aspirated engine may be provided wherein the compressor, turbine or both are omitted.

A number of sensors may be provided through the system. Sensors including oxygen, temperature, pressure, and mass air flow sensors may be positioned within the air intake, exhaust and exhaust recirculation flow paths. As illustrated in FIG. 2a, an oxygen sensor 156, such as a universal exhaust gas oxygen sensor (UEGO), is provided in the exhaust gas recirculation flow path 142 and another oxygen sensor 158, such as a heated exhaust gas oxygen sensor (HEGO), is provided in the exhaust flow path 140. The sensors are operatively coupled, such as through wiring or wirelessly, to an engine control unit as further described in FIG. 3. In addition, the sensors are operatively coupled to the various flow paths, i.e., the inlet flow path, the recirculation exhaust flow path, and the exhaust flow path, such that the sensors may detect conditions of the gasses within these flow paths. In embodiments, the sensors are retained in openings in the flow paths such that they contact the gasses within the flow path. In particular embodiments, one or more sensors are inserted into the flow paths, such that the gasses (air or exhaust) must flow around the sensor.

Figure 2B:
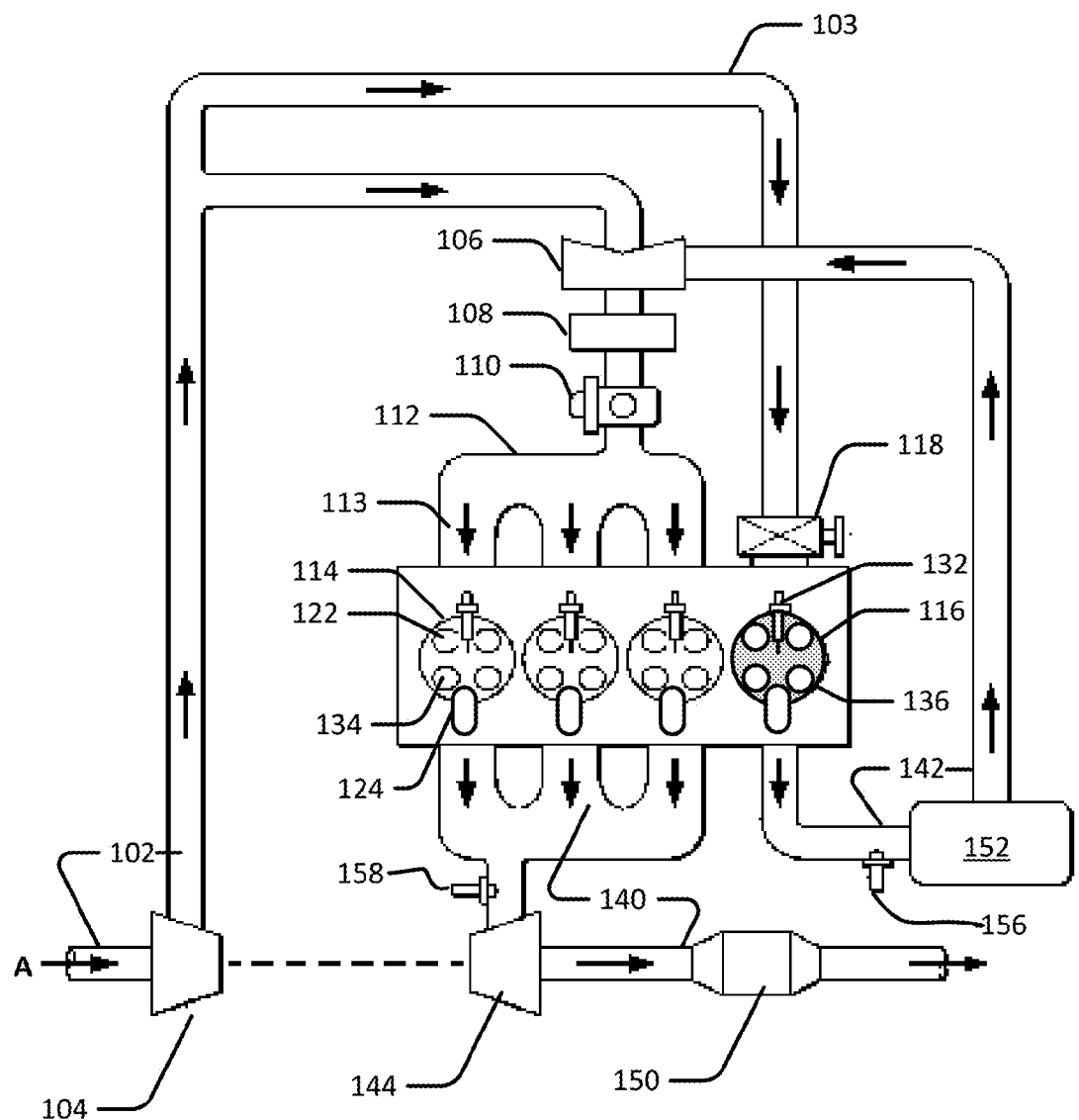
FIG. 2b illustrates a schematic of another embodiment of an engine including an exhaust gas recirculation loop, including a water gas shift catalyst provided in the flow path, a dedicated exhaust gas recirculation cylinder, and a separate undiluted intake for the dedicated-EGR cylinder.

FIG. 2b illustrates an embodiment with a different configuration of the air intake manifold. In this embodiment the air intake manifold 112 provides ambient air mixed with recirculated exhaust gas into the main cylinders 114 as previously described. However, the air intake manifold 112 does not provide the mixed air to the dedicated cylinder for exhaust gas recirculation 116. A secondary air intake pathway 103 diverts a portion of the ambient air to the dedicated exhaust gas recirculation cylinder 116. A port valve 118 or another valve that can be used to control air intake into the dedicated exhaust cylinder 116 may be positioned in the secondary air intake pathway 103, including a throttle valve in the secondary air intake pathway. In such an arrangement, the air introduced into the dedicated exhaust gas recirculation cylinder 116 is undiluted by the recirculated exhaust gas.

Figure 3:
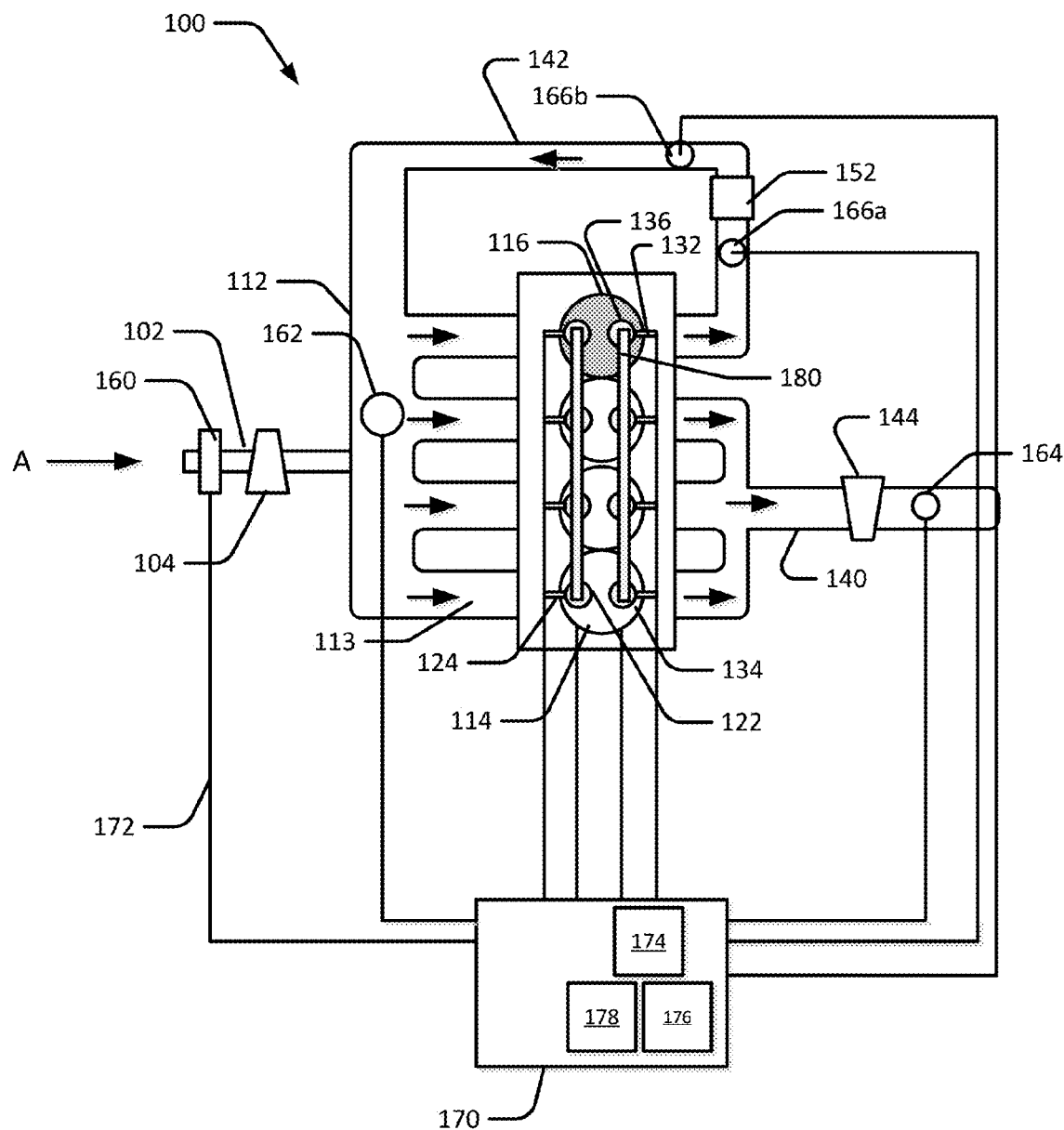
FIG. 3 illustrates a schematic of another embodiment of an engine including an exhaust gas recirculation loop, including a water gas shift catalyst provided in the flow path, and a dedicated exhaust gas recirculation cylinder, as well as an electronic control unit for regulating fuel injection and spark advance timing.

FIG. 3 illustrates another embodiment of an engine system including the sensors and an engine control module configured to implement and regulate the fueling strategies described herein. Like numbering is used to represent similar features as between FIGS. 2a, 2b and 3. In the illustrated embodiment, an alternative configuration of the exhaust gas recirculation flow path 142 is illustrated. In this embodiment, the recirculated exhaust gas is provided directly into the air intake manifold 112 from the exhaust recirculation flow path 142. Other than the reconfiguration of how the recirculated exhaust gas is introduced into the cylinders, the sensor arrangements and electronic control unit are applicable to the embodiments of FIGS. 2a and 2b.

As alluded to above, various sensors located through the air intake and exhaust flow paths provide information regarding temperature, pressure, oxygen ($O_2$) and mass air flow. As illustrated, a mass air flow sensor 160 is located in the air inlet pathway 102. The mass flow sensor is illustrated as being positioned before the compressor 104. Pressure, temperature, and oxygen sensors 162 are positioned within the air intake manifold 112 before the air flows through the individual manifold ports 113. Additional pressure, temperature, and oxygen sensors are preferably positioned within the secondary air intake pathway 103 if present as in FIG. 2b. Another oxygen sensor 164 is positioned in the exhaust flow path 140, this sensor is illustrated as being positioned after the turbine 144. Another oxygen and temperature sensors 166a is illustrated as being positioned in the exhaust recirculation path 142 before the water gas shift catalyst 152 and another oxygen temperature sensor 166b may be present after the water gas shift catalyst 152 in the exhaust flow path. Additional sensors, such as knock sensors, crank angle sensors, throttle position sensors, speed sensors, coolant sensors, etc., may also be present in the system.

The sensors are operatively coupled to an electronic control unit 170 via wiring 172 or wireless communication protocols. The electronic control unit preferably includes an input/output function 174 for receiving information from the sensors and sending information to the fuel injectors 124 and the valve train 180, which are also operatively coupled to the electronic control unit 170. The electronic control unit also preferably includes one or more memory devices 176, which may be understood as a device on which data is recorded and stored via manipulation of electrical, magnetic, optical or physical characteristics of the substrate. Data is also retrievable from the memory device. Data stored on the memory device may include the fuel injector control algorithms representative of the fueling strategy as well as spark timing algorithms representing the spark timing strategy. Information received by the electronic control unit from the sensors may also be stored in memory 176. The electronic control unit 170 also preferably includes a processor 178 for executing the fueling strategy and spark timing algorithms utilizing the data received from the sensors, engine state including e.g., crank angle, and any additional data that may also be stored in the memory device that may be necessary for carrying out the algorithms such as indicated mean effective pressures and spark advance over a range of fuel to air equivalence ratios in the dedicated cylinder at given speed and brake mean effective pressures.

The water gas shift catalyst preferably includes a support, such as an alumina ($Al_2O_3$) support, with a washcoat comprising one or more of the following Pd, Rh, Ce, Zr, La and Ba. In embodiments, for a catalyst of a given size, the alumina support may be present in the range of 1.0 to 1.8 grams per cubic inches; and in the washcoat Pd may be present in the range of 65 to 195 grams per cubic feet, including all values and ranges therein; Rh may be present in the range of 0 to 14 grams per cubic feet including all values and ranges therein; Ce may be present in the range of 900 to 1500 grams per cubic feet including all values and ranges therein; Zr may be present in the range of 650 to 1250 grams per cubic feet including all values and ranges therein; La may be present in the range of 272 to 290 grams per cubic feet including all values and ranges therein; and Ba may be present in the range of 0 to 280 grams per cubic feet including all values and ranges therein. The levels may be adjusted at 1 gram per cubic inch increments. In preferred embodiments, 1.0 grams per cubic inch to 1.8 grams per cubic inch of $Al_2O_3$ is present as a support and 60 to 70 grams per cubic foot of Pd, 9 to 19 grams per cubic foot of Rh, 895 to 1505 grams per cubic foot of Ce, 645 to 1255 grams per cubic foot of Zr, and 0 to 285 grams per cubic foot of Ba are present in the washcoat for a catalyst of a given size.

Preferred water gas shift catalyst formulations, for a given size of catalyst, include $Al_2O_3$ present at 1.8 grams per cubic inch, Pd present at 65 grams per cubic foot, Rh present at 14 grams per cubic foot, Ce present at 900 grams per cubic foot, Zr present at 1250 grams per cubic foot, and Ba present at 280 grams per cubic foot; $Al_2O_3$ present at 1.0 grams per cubic inch, Pd present at 65 grams per cubic foot, Rh present at 14 grams per cubic foot, Ce present at 1500 grams per cubic foot, Zr present at 1250 grams per cubic foot, and Ba present at 280 grams per cubic foot; $Al_2O_3$ present at 1.0 grams per cubic inch, Pd present at 65 grams per cubic foot, Rh present at 14 grams per cubic foot, Ce present at 900 grams per cubic foot, Zr present at 650 grams per cubic foot, and Ba present at 280 grams per cubic foot; and $Al_2O_3$ present at 1.0 grams per cubic inch, Pd present at 65 grams per cubic foot, Rh present at 14 grams per cubic foot, Ce present at 900 grams per cubic foot, Zr present at 1250 grams per cubic foot, and Ba present at 0 grams per cubic foot.

An engine cycle is understood herein as generally beginning with the introduction of air and fuel into the cylinders, progressing through compression and combustion of the air and fuel mixture, and ending when the products of combustion are exhausted from the cylinder. In the example of a four stroke cycle, the piston is displaced within the cylinder four times, two times up and two times down. Engine cycle may be expressed in terms of crank angle. In the example of a four stroke cycle, the crank shaft rotates two times and extends through 720 degrees of crank angle rotation for one engine cycle. Generally, the cycle may begin at top dead center—0 degrees crank angle, and the piston moves downward to bottom dead center—180 degrees of crank angle, during the induction of air and fuel into the cylinder. Compression occurs as the piston returns to top dead center and the crank angle approaches 360 degrees of crank angle. Combustion is typically initiated a few degrees before top dead center at 360 degrees. Combustion forces the piston down again and the crank angle progresses to 540 degrees. The products of combustion are then exhaust from the cylinder as the piston returns to top dead center and the crank angle reaches 720 degrees.

The engine may be run at a number of air to fuel operating conditions including stoichiometric or non-stoichiometric conditions. Stoichiometric conditions refer to air to fuel ratios inducted into the cylinder that provide the ideal ratio of air to fuel that burns all the fuel with no excess air. For a gasoline engine stoichiometric is about 14.7 (i.e., 14.7:1), and can vary depending on the composition and additives present in the fuel and air. Rich mixtures, or running rich, provide air to fuel ratios of less than stoichiometric. Lean mixtures, or running lean, provide air to fuel ratios of greater than stoichiometric. The air to fuel equivalence ratio λ is defined as follows.

$$\lambda = \frac{\text{air to fuel ratio actual}}{\text{air to fuel ratio stoichiometric}}$$

At an equivalence ratio of 1, the actual air to fuel ratio is at stoichiometric. Above 1, the mixture is considered a lean mixture, resulting in an excess of air and oxygen. Lean combustion burns hotter and more efficient, but generally creates a lot of wear on the system and increased levels of nitrogen oxide compounds are produced. Below 1, the mixture is considered rich, resulting in an excess of unburned fuel and products such as carbon monoxide, carbon dioxide, hydrogen ($H_2$) and carbon. Rich combustion is cooler and produces more power but is less efficient. Furthermore, the fuel to air equivalence ratio, phi ($\varphi$), is understood as the inverse of the air to fuel equivalence ratio, wherein $\varphi=1/\lambda$. In addition, as alluded to above, the main cylinders may run at one fuel to air equivalence ratio and the dedicated cylinders may run at another fuel to air equivalence ratio. In preferred embodiments, the main cylinders run lean and the dedicated cylinder runs rich through 7 to 9 engine cycles before rich to lean switching occurs.

Figure 4:
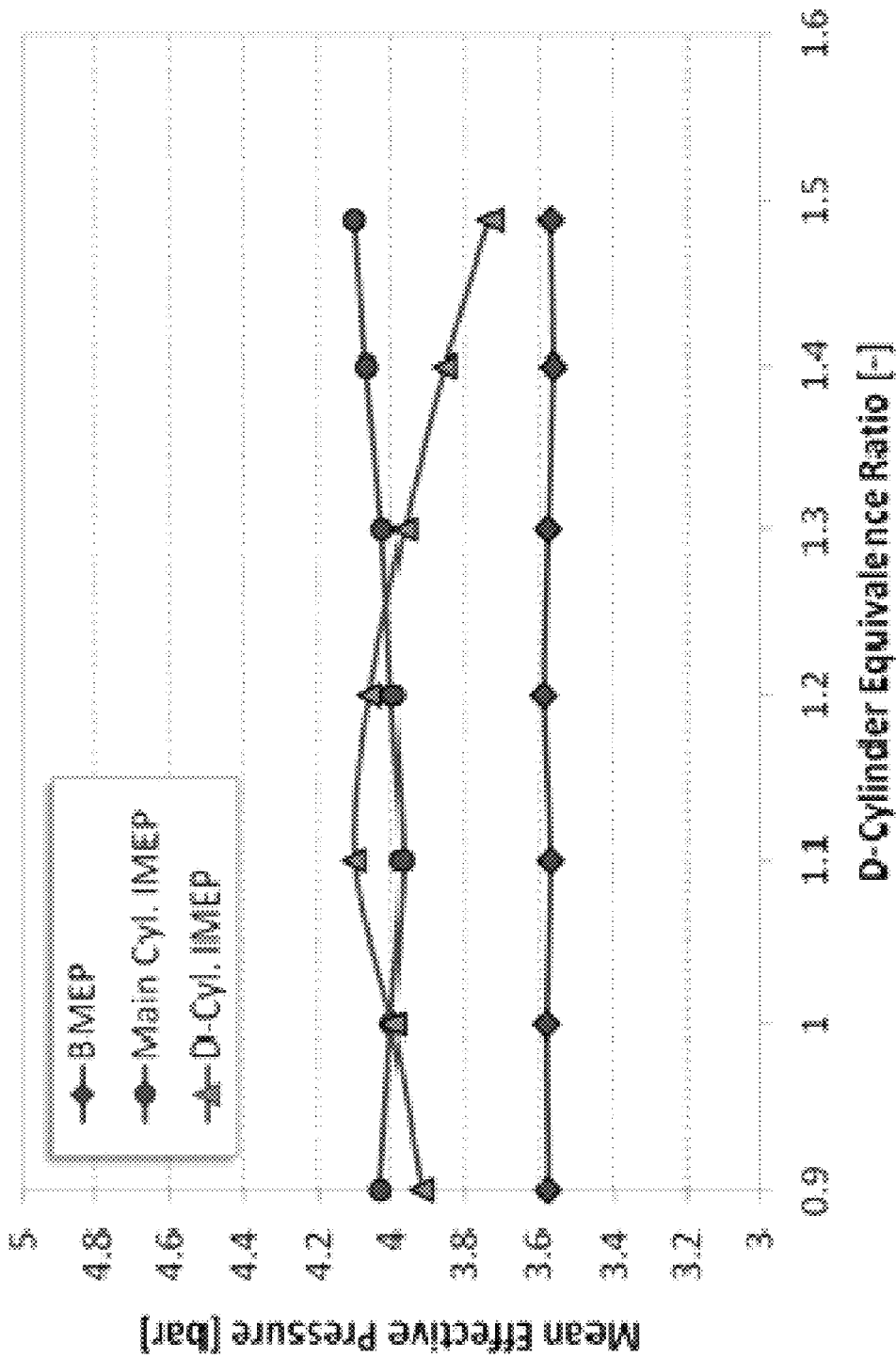
FIG. 4 illustrates an embodiment of the indicated mean effective pressure for the main cylinder, the indicated mean effective pressure for the dedicated cylinder, and the brake mean effective pressure over a sweep of dedicated cylinder fuel to air equivalence ratios when operating at a 1250 rpm and approximately a 3.5 brake mean effective pressure. It may be appreciated that a number of these plots may be produced adjusting the operating conditions including brake mean effective pressure and speed for a given engine.

FIG. 4 illustrates a graph of the net indicated mean effective pressures (net IMEP) at 1250 rpm/~3.5 bar of brake mean effective pressure (BMEP) for the dedicated and main cylinders of an engine. In addition, the brake mean effective pressure during a dedicated cylinder equivalence ratio sweep is shown in the graph. It can be seen that the dedicated cylinder (D-cylinder) peak indicated mean effective pressure (peak IMEP) is achieved between the dedicated cylinder fuel-air equivalence ratio, phi ($\varphi$), =1.1-1.2 at the speed and brake mean effective pressure conditions. As seen in FIG. 4, transitioning to a lean or rich equivalence ratio decreases the dedicated cylinder indicated mean effective pressure (IMEP). As a result, the rich-lean switching will cause the dedicated-cylinder IMEP to fluctuate by up to 10%, necessitating a compensation strategy.

Figure 5:
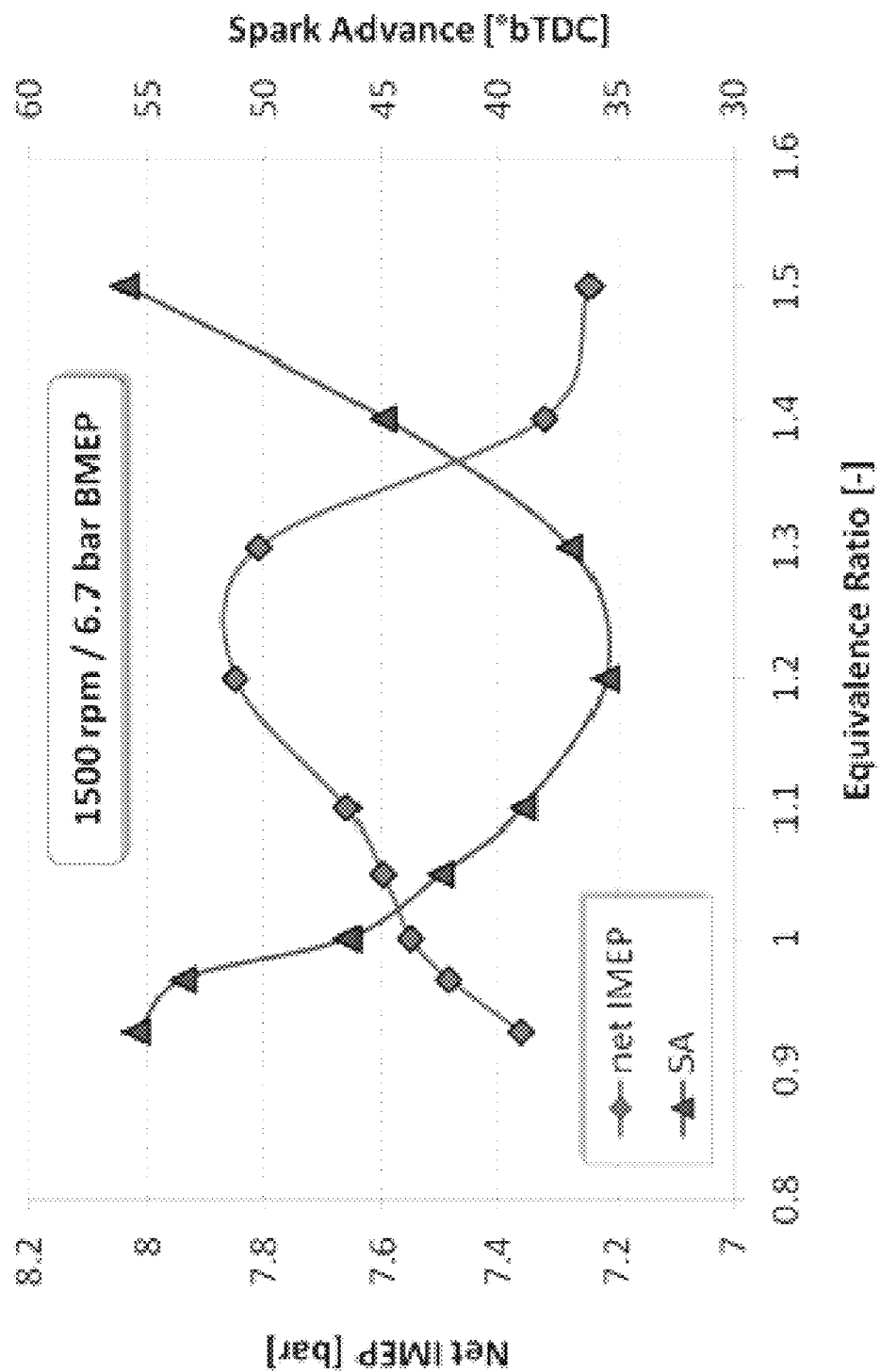
FIG. 5 illustrates an embodiment of net indicated mean effective pressure (net IMEP) and spark advance (degrees before top dead center) across a sweep of fuel to air equivalence ratios for the dedicated cylinder at a speed of 1500 rpm and a 6.7 bar brake mean effective pressure. It may be appreciated that a number of these plots may be produced adjusting the operating conditions including brake mean effective pressure and speed for a given engine.
Figure 6:
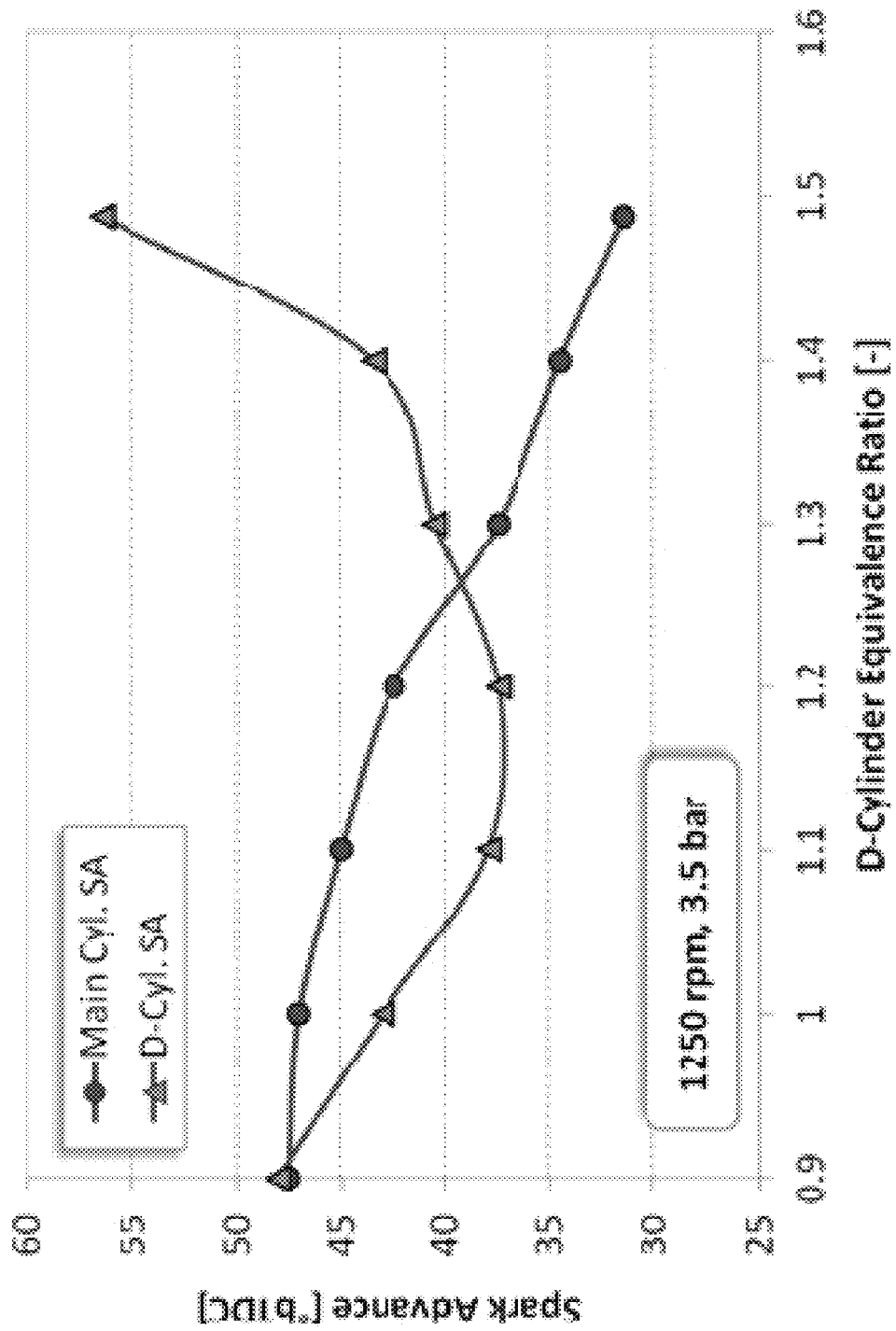
FIG. 6 illustrates an embodiment of spark advance (before top dead center) for the main cylinder and the dedicated cylinder across a sweep of fuel to air equivalence ratios for the dedicated cylinder at a speed of 1250 rpm and a 3.5 bar brake mean effective pressure. It may be appreciated that a number of these plots may be produced adjusting the operating conditions including the brake mean effective pressure and speed for a given engine.

Compensation for the fluctuation of the dedicated-cylinder IMEP is preferably accomplished by employing a dedicated-cylinder spark timing offset based on spark advance trends over equivalence ratio (compare FIG. 5 and FIG. 6). Furthermore, other IMEP affecting strategies can be utilized, such as altering the volumetric efficiency on the D-cylinder by employing individual valve events. The IMEP impact of the rich-lean switching on the main cylinders is minor as shown in FIG. 4. However, due to the lack of $H_2$ in the recirculated exhaust gas, the combustion stability can be reduced for the lean switching cycles in the main cylinders at relatively low engine loads. In embodiments low engine loads may be up to 50% of maximum engine load and high engine loads may be greater than 50% of maximum engine load, maximum load depending on the engine. FIG. 6 shows how reducing the dedicated cylinder fuel-air equivalence ratio, phi ($\varphi$), requires earlier spark advance for the main cylinders to maintain a constant combustion phasing. To compensate for the reduced combustion speeds that occur with lower amounts of $H_2$, a spark advance strategy for the main cylinders is preferably also applied.

By measuring pressures, temperatures, and mass flows in conjunction with knowing the volumes of the intake, exhaust, and recirculated exhaust gas flow path, a time delay can be calculated when the recirculated exhaust gas of the lean cycle is inducted by the main cylinders and the spark timing can be adjusted accordingly. Alternatively, an intake $O_2$ sensor can be utilized to sense the exhaust gas composition from the lean cycle. At knock limited relatively high loads, which are greater than relatively low loads, both the main and D-cylinder spark timing must be retarded due to increased knock propensity. In particular, the D-cylinder will require spark retard to compensate for the lack of excessive fuel dilution which leads to decreased combustion temperatures. That is, unless undiluted, ambient air is inducted into the D-cylinder as is the embodiment of FIG. 2b. When undiluted air is inducted into the D-cylinder, is not necessary to retard spark timing in the D-cylinder. The main cylinder will feature reduced knock resistance owing to the lack of $H_2$ and CO, which both have octane enhancing effects in gasoline engines. Moreover, the rich-lean switching catalyst regeneration strategy requires main cylinder pulse width adjustment. When the exhaust gas from the lean cycle is inducted by the main cylinders, the main cylinder injector pulse width must be increased, i.e., the amount of fuel is increased, since considerable amounts of re-circulated fuel energy coming from in-cylinder fuel reforming and products of incomplete combustion are lacking.

Thus, in an embodiment of a method of implementing fueling control to assist in reducing coking on the surface of the water gas shift catalyst is provided wherein the method includes supplying an air mixture comprising ambient air and recirculated exhaust gas through an air intake manifold to a main cylinder and a dedicated cylinder. Fuel is also supplied to the cylinders. The air mixture and fuel are compressed and combusted. Exhaust from the dedicated cylinder is recirculated to be combined with ambient air entering the air intake manifold. The air mixture and fuel are combusted in the main cylinder, and, in embodiments, the dedicated cylinder, to provide the exhaust recirculated from the dedicated cylinder.

The dedicated cylinder is preferably operated at a fuel to air equivalence ratio of greater than 1.0 (1.0 being stoichiometric), such as in the range of 1.1 to 1.6, including all values and ranges therein, for a first number of engine cycles, such as in the range of 7 to 9 cycles, and preferably at fuel to air equivalence ratios in the ranges of 1.1 to 1.3, 1.1 to 1.2, or 1.2 to 1.3. Every 8 to 10 engine cycles, for a second number of engine cycles a switch is made to run the dedicated cylinder in lean operation, where less fuel is introduced as compared to the rich cycle. The cylinder is preferably leaned out in the range of 5 to 10% to produce excess oxygen. In embodiments, the fuel to air equivalence ratio may be in the range of 0.7 to less than 1.0, including all values and ranges therein, and preferably in the range of 0.9 to less than 1.0. The second number of engine cycles is preferably just a single cycle; however, the second number of engine cycles may be in the range of 1 to 4 engine cycles.

To accommodate for leaner operation during the second number of engine cycles, a first spark timing of the dedicated cylinder is adjusted. That is, the timing offset is altered based upon data developed that indicates the spark advance timing for a given fuel-air equivalence ratio, phi ($\varphi$), for the given operating load, or brake mean effective pressure, such as the data illustrated in FIGS. 5 and 6, as well as any additional data for other operating conditions. In preferred embodiments, the spark timing of the dedicated cylinder is advanced during the lean cycles. This information may be stored in the electronic control unit and referenced during operation. In addition, or alternatively, to compensate for the lean operating conditions, the volumetric efficiency of the dedicated-cylinder may be adjusted. As noted, this may be accomplished by utilizing individual valve events using variable valve timing. Again, the indicated mean pressure impact of the rich-lean switching on the main cylinders appears to be minor as seen in FIG. 4.

The recirculated exhaust from the lean combustion cycle of the dedicated cylinder then reduces the amount of hydrogen ($H_2$) in the intake air when the recirculated exhaust gas is mixed with the ambient air. Without adjustment, this may reduce combustion stability and combustion speeds, particularly at low loads, in the main cylinders. Preferably, spark advance (before top dead center, bTDC) is performed in the main cylinders to compensate. The amount of spark advance and when to trigger spark advance may be determined by factoring in pressures, temperatures and mass flows in conjunction with the known volumes of the intake, exhaust, exhaust gas recirculation pathway and operating load. Alternatively, an oxygen sensor may be used to sense the oxygen in the recirculated exhaust gas from the lean cycle.

As the lean combustion cycle exhaust may not be immediately inducted into the main cylinders, and, in some embodiments, the dedicated cylinder, a time delay is determined when exhaust recirculated from the dedicated cylinder will be inducted into the cylinders. At the end of the time delay the spark timing of the cylinders into which the recirculated exhausted gas will be inducted may be adjusted. In relatively high load operating conditions, where knock propensity is increased, the spark timing of the cylinders is preferably retarded. Delay of spark timing in the dedicated cylinder when exhaust gas is inducted into the dedicated cylinder is particularly helpful due to the lack of excessive fuel dilution, which leads to decreased combustion temperatures as noted above. Spark advance may be adjusted to occur at a crank angle in the range of 25 to 70 degrees before top dead center, and preferably in the range of 35 to 60 degrees before top dead center, including all values and ranges therein. Spark timing of the main and dedicated cylinders may be independently adjusted.

Finally, fuel injection pulse width in the main cylinder may need to be increased when the recirculated exhaust gas from the lean operating dedicated cylinder is estimated to be inducted into the main cylinders. If the pressure in the fuel system is maintained constant, this will deliver an increased amount of fuel. The fuel injection pulse width may be increased by 1% or greater, such as in the range of 1% to 100%.

It may be appreciated that the inherent efficiency improvement with dedicated exhaust gas recirculation cannot be realized for the lean cycles. However, the possibility to use a water gas shift catalyst and/or steam reformation catalyst at least compensates, if not overcompensates, for the slight efficiency reduction during the lean regeneration cycles in the dedicated cylinder and enable an overall engine efficiency and knock improvement. Further, it may be appreciated that the methods described herein may be implemented on any dedicated exhaust gas recirculation engine where catalysts for increased $H_2$ production are installed in the dedicated cylinder exhaust gas recirculation flow path.

The invention claimed is:

1. A method of operating a dedicated exhaust gas recirculation engine including a water gas shift catalyst located in a flow path of an exhaust gas recirculation flow path, comprising:
   supplying air to a main cylinder and a dedicated cylinder, wherein said air includes ambient air;
   supplying exhaust recirculated from said dedicated cylinder into said main cylinder with said air;
   supplying fuel to said main cylinder and said dedicated cylinder;
   combusting said air and fuel in said main cylinder and said dedicated cylinder;
   recirculating exhaust from said dedicated cylinder to said main cylinder;
   wherein for a first number of engine cycles said air and said fuel are supplied to said dedicated cylinder at a first fuel to air equivalence ratio in the range of greater than 1.0 to 1.6 and for a second number of engine cycles said air and fuel are supplied to said dedicated cylinder at a second fuel to air equivalence ratio in the range of 0.7 to less than 1.0;
   adjusting a first spark timing of said dedicated cylinder during said second number of cycles at said second fuel to air equivalence ratio;
   determining a time delay when exhaust recirculated from said dedicated cylinder will be inducted into said main cylinder;
   at the end of said time delay adjusting a second spark timing of said main cylinder and adjusting an amount of said fuel supplied to said main cylinder by increasing said amount.

2. The method of claim 1, wherein said first spark timing is advanced.

3. The method of claim 1, further comprising supplying said exhaust recirculated from said dedicated cylinder into said dedicated cylinder with said air, recirculating said exhaust from said dedicated cylinder to said dedicated cylinder, and adjusting a third spark timing of said dedicated cylinder at the end of said time delay.

4. The method of claim 3, wherein said second spark timing and said third spark timing are independently adjusted.

5. The method of claim 4, wherein said second and third spark timing are delayed.

6. The method of claim 1, wherein said first number of engine cycles is in the range of 7 to 9 cycles.

7. The method of claim 1, wherein said second number of cycles is one cycle.

8. The method of claim 1, wherein said fuel is supplied into an air intake manifold with said air or into said main cylinder and said dedicated cylinder.

9. The method of claim 1, wherein said fuel is fumigated.

10. The method of claim 1, wherein said ambient air is compressed prior to mixing with said exhaust.

11. A system for the operation of a dedicated exhaust gas recirculation engine including a water gas shift catalyst located in an exhaust gas recirculation flow path, comprising:
    an air inlet flow path coupled to through an air intake manifold to a main cylinder and said air inlet flow path is coupled to a dedicated cylinder, wherein each of said main cylinder and said dedicated cylinder comprises an intake valve, an exhaust valve and a spark plug;
    a first fuel injector associated with said main cylinder and a second fuel injector associated with said dedicated cylinder;
    an exhaust gas recirculation flow path coupled to said exhaust valve of said dedicated cylinder and to said air intake manifold;
    a water gas shift catalyst located in said exhaust gas recirculation flow path;
    a plurality of sensors, including at least one sensor operatively coupled to said air inlet flow path, at least one sensor operatively coupled to said air intake manifold, and at least one sensor operatively coupled to said exhaust gas recirculation flow path; and
    an electronic control unit operatively coupled to said plurality of sensors, said fuel injectors, said intake valves and said exhaust valves, wherein said electronic control unit is configured to a) adjust a first fuel to air equivalence ratio in said dedicated cylinder in the range of greater than 1.0 to 1.6 for a first number of engine cycles; b) adjust a second fuel to air equivalence ratio in said dedicated cylinder in the range of 0.7 to less than 1.0 for a second number of engine cycles which are alternated with said first number of cycles; c) adjust a first spark timing of said spark plug in said dedicated cylinder during said second number of cycles; d) determine a time delay when exhaust recirculated from said dedicated cylinder will be inducted into said main cylinder; and e) at the end of said time delay adjust a second spark timing of said spark plug in said main cylinder and adjust an amount of fuel supplied to said main cylinder by said fuel injector associated with said main cylinder.

12. The system of claim 11, wherein said first spark timing is advanced.

13. The system of claim 11, wherein said dedicated cylinder is coupled to said air inlet flow path through said air intake manifold, and said method further comprises adjusting a third spark timing of said dedicated cylinder at the end of said time delay.

14. The system of claim 13, wherein said second spark timing and said third spark timing are independently adjusted.

15. The system of claim 14, wherein said second and third spark timing are delayed.

16. The system of claim 11, wherein said first number of engine cycles is in the range of 7 to 9 cycles.

17. The system of claim 11, wherein said second number of engine cycles is one cycle.

18. The system of claim 11, wherein said first fuel injector is configured to supply fuel into said air intake manifold or into said main cylinder.

19. The system of claim 11, wherein said air inlet flow path includes a compressor.

* * * * *